United States Patent

Bowlin

[11] Patent Number: 6,032,564
[45] Date of Patent: *Mar. 7, 2000

[54] SAW CARRIAGE

[76] Inventor: William P. Bowlin, 418 Goldsberry Cir., Shreveport, La. 71106

[ * ] Notice: This patent is subject to a terminal disclaimer.

[21] Appl. No.: 08/688,795

[22] Filed: Jul. 31, 1996

Related U.S. Application Data

[60] Provisional application No. 60/007,363, Nov. 2, 1995.

[51] Int. Cl.$^7$ .................................. B26D 1/14; B27B 5/00
[52] U.S. Cl. ........................... 83/508.3; 83/75.5; 83/76.8; 83/160; 83/368; 83/425.2; 83/436.9; 83/471.1
[58] Field of Search ............................... 83/75, 368, 76.1, 83/76.6, 76.7, 76.8, 76.9, 75.5, 425.2, 471.1, 508.3, 453, 436.9, 436.7, 436.3, 160

[56] References Cited

U.S. PATENT DOCUMENTS

| | | | |
|---|---|---|---|
| 1,721 | 8/1840 | McDowell | 83/436.7 X |
| 1,085,656 | 2/1914 | Allen | 83/436.3 X |
| 2,039,017 | 4/1936 | McLeod | 83/436.7 |
| 2,625,185 | 1/1953 | Merry | 83/436.7 X |
| 3,570,349 | 3/1971 | Behrendt et al. | 83/453 X |
| 4,031,790 | 6/1977 | Arvidsson | 83/425.4 |
| 4,040,459 | 8/1977 | Bush, Jr. et al. | 83/425.2 X |
| 4,074,601 | 2/1978 | Warren et al. | 83/368 X |
| 4,085,638 | 4/1978 | Fifer | 83/368 X |
| 4,277,998 | 7/1981 | Mayo | 83/425.2 X |
| 4,277,999 | 7/1981 | Conner et al. | 83/425.3 |
| 4,294,149 | 10/1981 | Olsson | 83/435.1 |
| 4,362,195 | 12/1982 | Hill | 83/160 X |
| 4,468,993 | 9/1984 | McCown et al. | 83/112 |
| 4,596,172 | 6/1986 | Visser | 83/75.5 |
| 4,640,160 | 2/1987 | Hards | 83/71 |
| 4,765,215 | 8/1988 | Spath | 83/160 X |
| 4,907,294 | 3/1990 | Bolton et al. | 364/474.09 |
| 5,042,341 | 8/1991 | Greten et al. | 83/75.5 |
| 5,251,142 | 10/1993 | Cramer | 83/76.8 X |
| 5,579,671 | 12/1996 | Bowlin | 83/75.5 |

*Primary Examiner*—Rinaldi I. Rada
*Assistant Examiner*—Charles Goodman
*Attorney, Agent, or Firm*—John M. Harrison

[57] ABSTRACT

A saw carriage or module for manually, semiautomatically or automatically cutting stems typically supplied by a stem handling apparatus, which stem handling apparatus delivers full-sized, substantially tree-length stems to one or more of the saw carriages for cutting into logs, poles or other segments. During automatic operation of the module(s) stems are typically scanned by an optical device and the physical characteristics of the scanned stem are sent to a computer, which selects the cutting pattern and transfers this information to a programmable logic controller. The programmable logic controller typically orchestrates positioning of one or more linearly-adjustable saw carriages or modules and on-board carriage saw blades to optimize cutting of the stems into the segments. After the modules and saws are so positioned, each stem is sequentially transferred by the handling apparatus to the saw modules, where it is positioned, clamped and cut into multiple segments at the preselected optimum points. Stem segments are ejected from the saw carriages or modules by ejecting devices provided on each module.

14 Claims, 5 Drawing Sheets

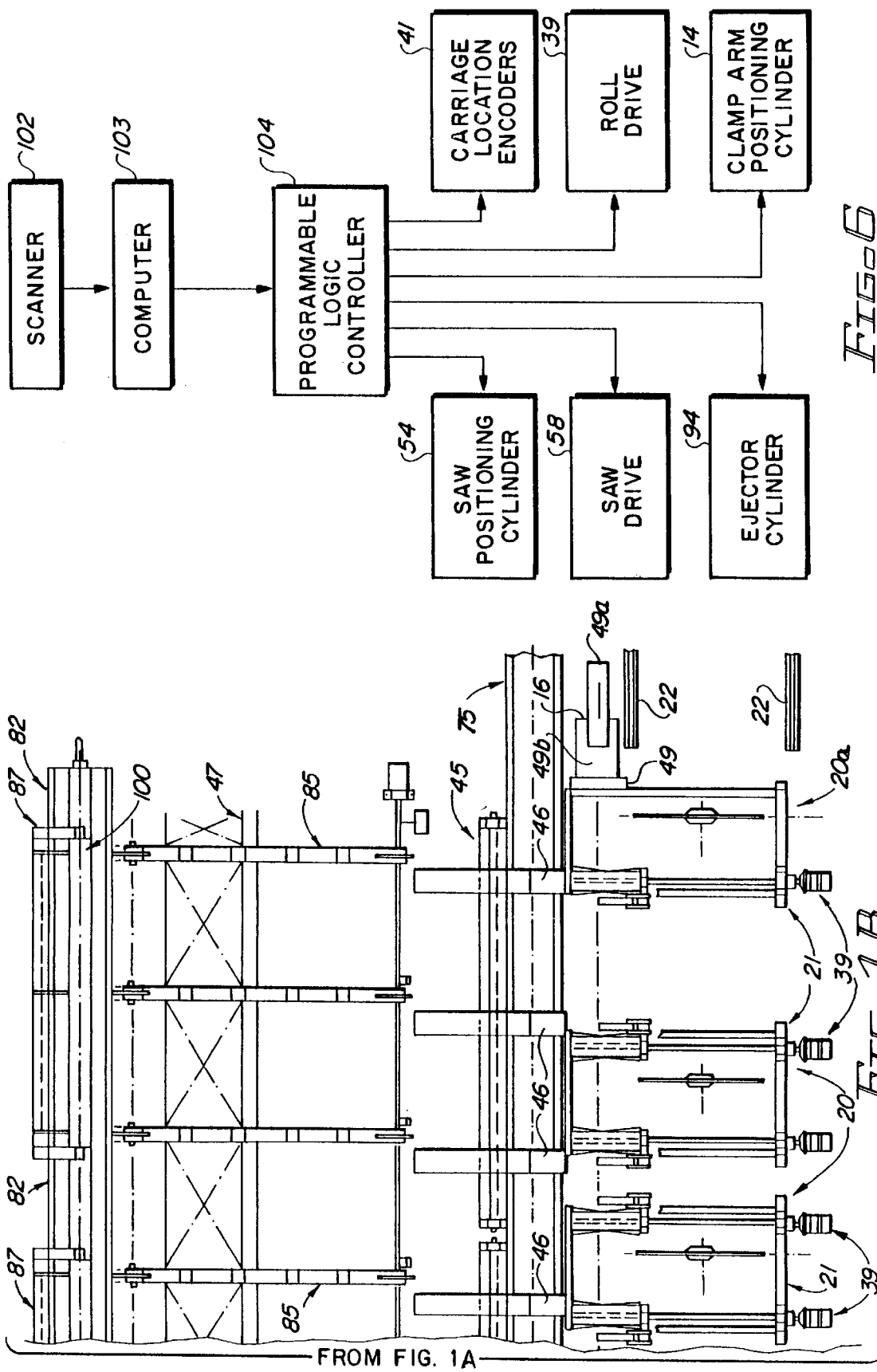

SAW CARRIAGE

CROSS-REFERENCE TO THE RELATED PATENT APPLICATIONS

This application is a continuation of U.S. Provisional patent application No. 60/007,363 filed Nov. 20, 1995 and is related to my U.S. patent application Ser. No. 08/374,240, filed Jan. 18, 1995, Now U.S. Pat. No. 5,579,671.

BACKGROUND OF THE INVENTION

1. Field of the Invention

This invention relates to the cutting of full-sized, substantially tree-length "stems" by means of a manual, semiautomatic or automatic saw carriage or carriages, typically in connection with a stem handling apparatus which is designed to deliver the stems to the saw carriages or modules for cutting into segments of optimum character. The linearly adjustable saw carriages of this invention typically operate in a preferred automatic mode with respect to a fixed carriage in cooperation with a scanner for determining the physical characteristics of incoming stems in sequence, a computer for receiving the scanned information and selecting optimum stem cuts and a programmable logic controller for receiving data from the computer and executing commands to orchestrate operation of the respective adjustable and fixed saw carriage functions. The adjustable saw carriages are pre-positioned for optimum cutting of each stem by means of a module drive assembly and encoder assembly connected to the programmable logic controller and include rollers for receiving and positioning the stems against a butt plate for indexing the stems, clamps for stabilizing the stems in position prior to cutting, swinging circular saws for cutting the clamped stems in concert at the optimum locations determined by the computer and ejection mechanisms for ejecting the cut stem segments, typically onto a conveyor for further processing.

One of the problems associated with "bucking" or handling tree-length logs, or "stems" of various size and shape with an infinite pattern of sweep, knots, depressions, twists and other defects and cutting the stems into properly sized logs, poles and other segments for further processing, is that of effecting optimum cuts for each stem in order to provide an optimum stem value from the segments. various scanning devices and mechanical means for achieving this purpose have been developed in combination with log bucking saws, slasher decks, debarkers and like equipment. A primary problem associated with these systems is the complexity of the cutting equipment required and the accompanying slow feed and processing time required to initially determine the optimum cuts in the stem and subsequently effect these cuts in an efficient manner to produce stem segments of optimum length. Added to the problem of slow processing and handling time is that of the considerable down-time required for maintenance purposes, which maintenance down-time is a function of the complexity of the equipment used to process the stems into logs and other segments.

2. Description of the Prior Art

Various log "bucking" and cutting systems are known in the art. U.S. Pat. No. 4,468,993 dated Sep. 4, 1984, to Jack R. McCown, et al, details a "Small Log Bucking System" in which a log is scanned to determine its size and shape, the resulting data are analyzed by a computer which determines the optimum location for cuts and the proposed cut locations are displayed on the log optically for the operator's inspection. If the operator overrides any of the proposed cuts, the computer re-calculates any cuts not specified by the operator. When all cuts have been approved, the log is kicked to a cutting bed where the cuts are made by two, independently controllable travelling saws. The cutting bed is preferably defined by three sets of parallel plates, the first set of which includes stationary plates having V-shaped upper edges which define a V-shaped trough in which the log is initially received. The second and third sets of plates are vertically movable and, when raised together, define a second V-shaped trough located above the first trough. After the logs are received in the first trough, the movable plates are raised to elevate the log to the second trough, where it is cut. After each cut is effected, the movable plate supporting the downstream side of the cut-off segment are lowered to allow the segment to roll onto an output conveyor, which carries it to the next work station. In this manner, the segments are automatically singulated without a separate singulating station. U.S. Pat. No. 4,640,160 dated Feb. 3, 1987, to John E. Hards, details a "Sweep-Data-Responsive, High-Speed Continuous-Log-Travel Bucking Apparatus". The system features continuous log travel and includes a flying-saw, log-bucking mechanism in combination with an upstream scanner which is capable of producing data related to a log "sweep". A computer which is interposed between the bucking mechanism and the scanner makes a decision at least partially based on log-sweep data, as developed by the scanner, to determine the optimum bucking position or positions along the log length to obtain the maximum recovery of useable end product. A "Log Scanning System" is detailed in U.S. Pat. No. 4,907,294, dated Mar. 6, 1990, to William E. Bolton, et al. The bucking operation includes a log deck with logs delivered laterally onto a log stem holder and from the holder onto the conveyor chain for conveying the log stems in sequence through the bucking saw. The log stem holder constitutes a component of a scanning station. An overhead support has a carriage that is guided along the holder and scanners carried by the carriage obtain dimensional data of the vertical and lateral dimensions of the log stems at selected cross-sections. A laser beam transmitter on the carriage transmits the data to a stationary computer mounted at one or both ends of the scanning station.

It is an object of this invention to provide one or more improved, simple and efficient linearly-adjustable saw carriages for cutting stems into segments of desired length, which saw carriages may be linked to a scanner, a computer and a programmable logic controller to automatically cut incoming, previously evaluated stems into logs, poles and other segments of optimum length for further processing.

Another object of this invention is to provide at least one, and preferably multiple, linearly-adjustable saw carriages and a single, fixed saw carriage for cutting stems which may be automatically evaluated and cut by at least the following elements: an optical scanning device for analyzing the physical characteristics of incoming stems in sequence; a computer for receiving the scanned data and determining optimum stem cuts; and a programmable logic controller for controlling the various saw carriage functions, including linear adjustment of the adjustable saw carriages. In a preferred embodiment, the separately linearly-adjustable saw carriages are each fitted with an encoder and a companion spur gear drive system mechanically connected to the encoder. The encoder and spur gear drive system are electrically connected to the programmable logic controller for adjusting the movable carriages with respect to the sequentially loaded stems. The fixed and movable carriages further including stem rollers, stem clamping devices, a swinging circular saw and segment-ejecting mechanisms, each orchestrated by the programmable logic controller, for receiving a stem from a loading apparatus, adjusting the stem against a butt plate provided on the fixed carriage to a common cutting orientation, clamping the stem in place, cutting the stem into segments of selected or optimum length and ejecting the segments from the saw carriages, typically onto a conveyor for transport to further processing.

A still further object of this invention is to provide a new and improved fixed saw carriage and at least one linearly-adjustable saw carriage, the latter oriented for linear adjustment with respect to the fixed saw carriage. The saw carriages are typically computer-controlled and as such, operate in cooperation with an optical scanner for determining the physical characteristics of incoming stems in sequence, a computer electrically coupled to the scanner and a programmable logic controller electrically connected to the computer and to an encoder assembly and a fluid-operated spur gear module drive assembly. The programmable logic controller controls the various functions of the saw carriages by orchestrating the carriage positioning encoder system and module drive assembly in the movable saw carriages for linear adjustment of the movable saw carriages with respect to the fixed saw carriage. The programmable logic controller also orchestrates operation of the respective fluid-operated roll drives, clamp arm positioning cylinders, saw positioning cylinders and stem-ejecting cylinders provided in each one of the linearly-adjustable saw carriages and the fixed saw carriage, as well as the fluid-operated butt plate positioning cylinder in the fixed saw carriages. The movable saw carriages are preferably mounted on rails to facilitate precise positioning of the corresponding carriage cutting saws adjacent to a stem loading platform.

SUMMARY OF THE INVENTION

These and other objects of the invention are provided in one or more new and improved manual, semiautomatic or automatically-operated, linearly-adjustable saw carriages and a single fixed saw carriage, designed to cut stems into logs, poles and other segments of desired or optimum length for further processing. The saw carriages are operated manually, or by a programmable logic controller (semiautomatic operation) or by means of a scanner, computer and programmable logic controller (automatic operation). The scanner and computer equipment initially determine the physical characteristics of the stems and optimum stem cuts to be made as the stems arrive, typically on an incoming conveyor. A loading apparatus of any desired design located adjacent to the incoming conveyor typically receives the stems in sequence as they are diverted from the incoming conveyor and loads them one-by-one on the aligned saw carriages. In a preferred embodiment the single, fixed saw carriage and multiple, rail-mounted, linearly-adjustable, movable saw carriages, all fitted with a pivoting circular saw, are typically aligned adjacent to the loading apparatus with the fixed saw carriage on one end. The movable saw carriages are provided with encoders electrically linked to the programmable logic controller and mechanically connected to a hydraulically-operated spur gear drive system which is orchestrated by the programmable logic controller, for semiautomatically or automatically positioning the movable saw carriages and saws with respect to the incoming stems and sequentially processing the stems into segments of optimum length. The stems are first loaded onto the saw carriages, adjusted, if necessary, by rollers into cutting position against a butt plate on the fixed saw carriage, clamped into this cutting position and cut by the saws. An ejector mechanism located in each of the saw carriages then ejects the released cut segments onto a conveyor or other apparatus for transport to further processing.

DESCRIPTION OF THE DRAWINGS

The invention will be better understood by reference to the accompanying drawings, wherein:

FIGS. 1A and 1B are a plan view consisting of two sheets joined at a match line of a typical saw carriage apparatus with six adjustable saw carriages and a single fixed saw carriage in stem-cutting configuration;

FIG. 6 is a block diagram of a preferred scanner, computer, programmable logic controller, carriage location encoder, saw drive, roll drive, saw positioning cylinder, clamp arm positioning cylinder and ejector cylinder combination for automatically or semiautomatically operating the saw carriages and processing the stems.

DESCRIPTION OF THE PREFERRED EMBODIMENTS

Figure 1:
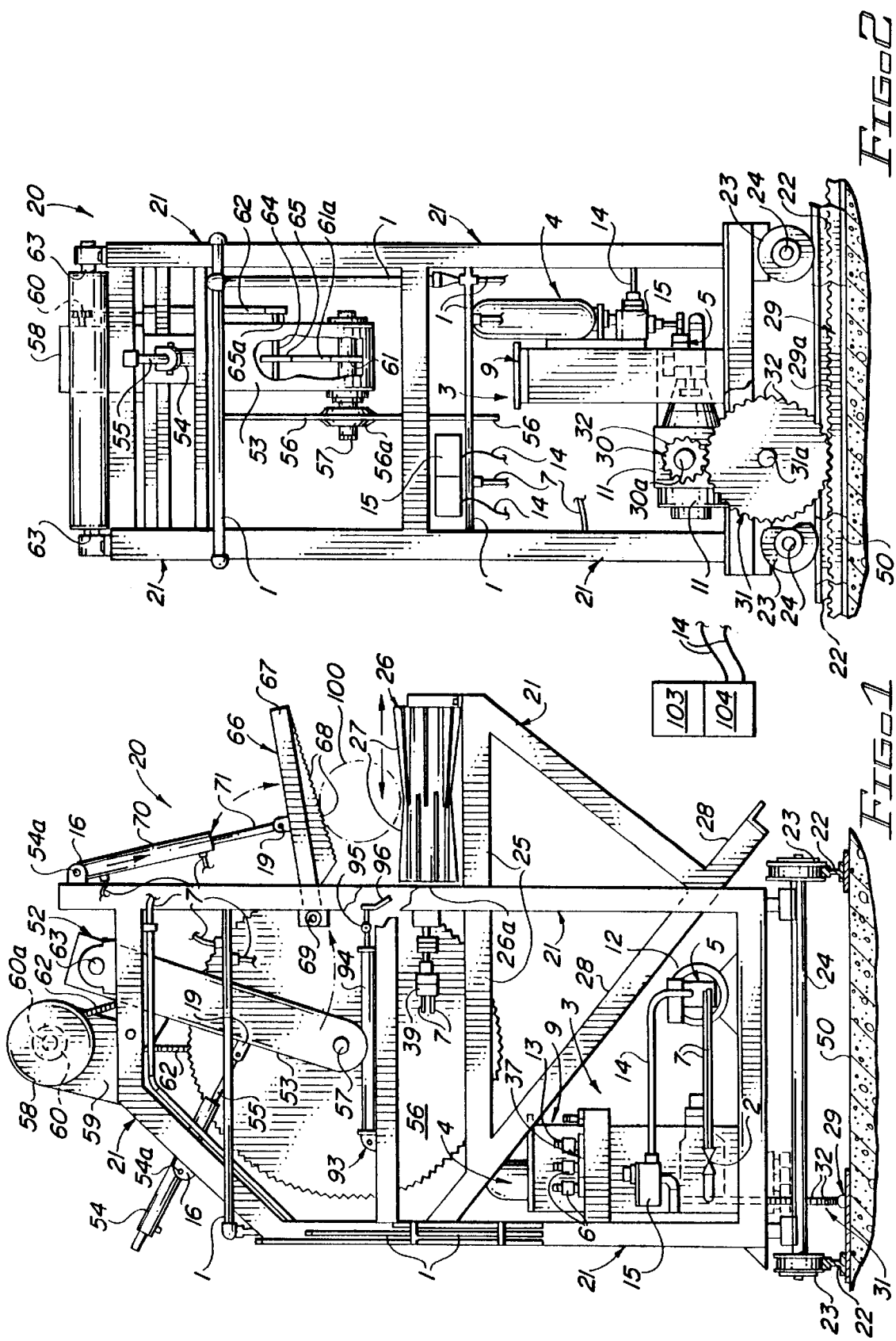
FIG. 1 is a left side view of a preferred embodiment of the saw carriage of this invention with the encoder assembly removed for brevity.

Referring initially to FIGS. 1, 1A, 1B, 2 and 6 of the drawings, in a preferred embodiment a typical moveable saw carriage of this invention is illustrated by reference numeral 20 and a fixed carriage by numeral 20a ; In a typical installation, multiple moveable saw carriages 20, and a single fixed saw carriage 20 a as illustrated in FIGS. 1A and 1B, are aligned adjacent to respective stem loaders 45 of selected design and typically having loading arms 46 to receive the stems 100 in sequence from stem loaders 45 and load them on the moveable saw carriages 20 and the fixed saw carriage 20a. A loading conveyor 85 typically transfers the stems 100 from a stem conveyor 82, where the stems are initially scanned by a scanner 102 and diverted from the stem conveyor 82 to the loading conveyor 85, mounted on a loading frame 47, by means of a stem diverter 87, typically as described in my U.S. Pat. No. 5,579,671 and as illustrated in FIGS. 1A and 1B. Each of the movable saw carriages 20 is characterized by a carriage frame 21, and with the exception of the single, end-located fixed saw carriage 20a,as described in my patent and as further illustrated in FIG. 1B, the movable saw carriages 20 are fitted with a pair of flanged wheels 23 that roll on corresponding rails 22, mounted on a supporting surface 50. The flanged wheels 23 are designed to engage and traverse the rails 22 in a linearly-controlled manner, as further illustrated in FIG. 2. A wheel shaft 24 connects the respective pairs of flanged wheels 23 to facilitate traversal of the carriage frame 21 of the movable saw carriages 20 in both directions, parallel to the stem loaders 45, as further hereinafter described. A horizontal cutting platform 25 is located on each of the carriage frames 21 and receives a pair of shaped cutting rollers 26, each mounted on a rotatable roller shaft 26a, and designed to receive each stem 100 from the stem loaders 45, as further hereinafter described. Each of the roller shafts 26a is provided with a roll drive 39, operated by a solenoid valve 13, electrically linked to the programmable logic controller 104 by suitable wiring (not illustrated) wired into the junction boxes 15 and connected to the programmable logic controller 104 by additional electric wiring 14. The roll drives 39 automatically drive the respective cutting rollers 26 and shift each incoming stem 100 against a butt plate 49, mounted on the butt plate positioning cylinder piston 49b of a butt plate positioning cylinder 49a, as illustrated in FIG. 1B. The butt plate positioning cylinder 49a is typically mounted on the carriage frame 21 of the fixed saw carriage 20a by means of a cylinder mount plate 16. Each of the cutting rollers 26 is fitted with multiple, radially-shaped roller plates 27 for seating each stem 100 in sequence on the cutting rollers 26, as illustrated in FIG. 1. A sawdust chute 28 is mounted on the carriage frame 21 beneath the cutting platform 25 to receive and channel sawdust from the cut logs, poles and other segments and divert the sawdust to a sawdust conveyor or other apparatus (not illustrated).

Figure 5:
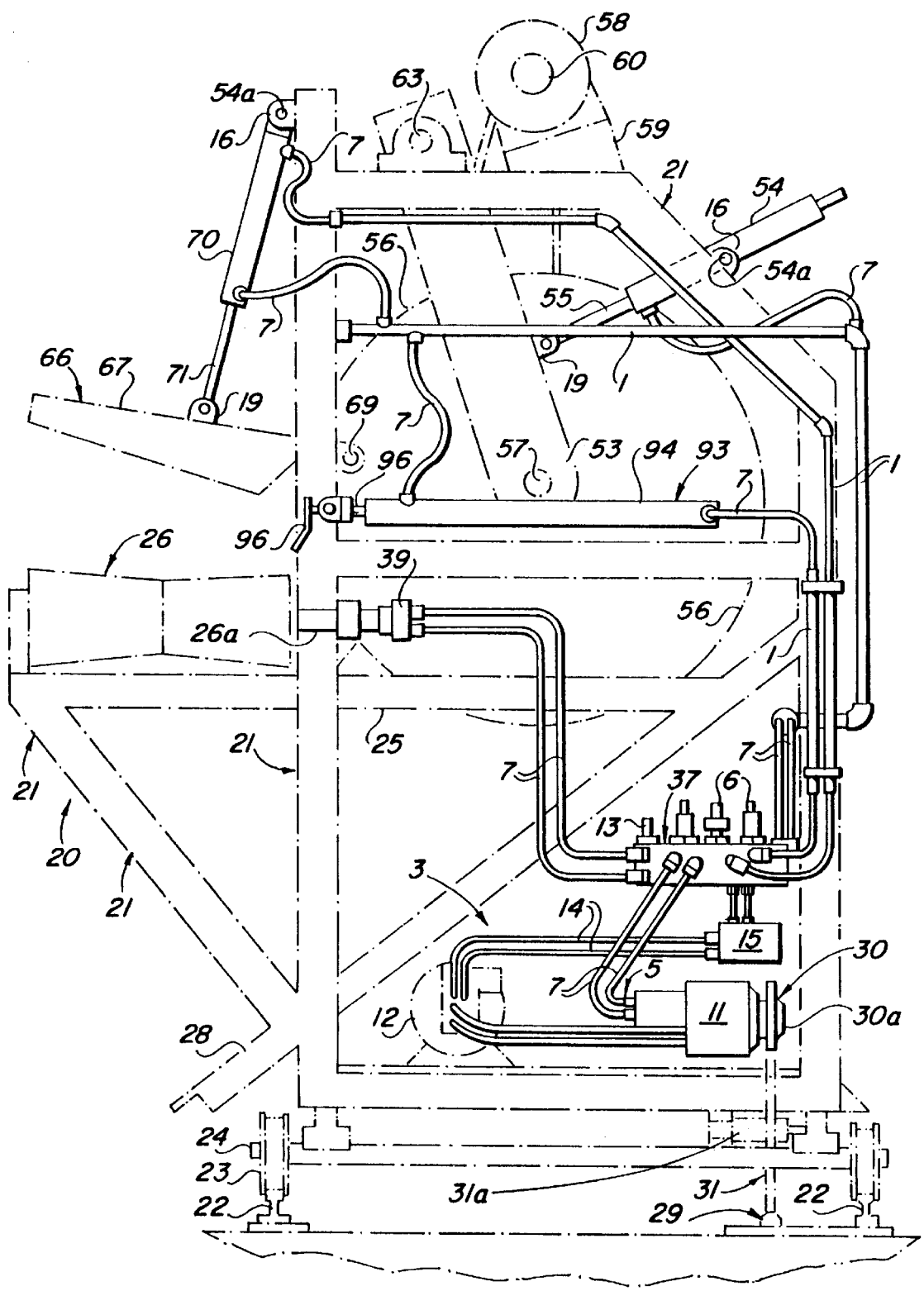
FIG. 5 is a right side view of the saw carriage illustrated in FIGS. 1 and 2 with the reservoir and accumulator removed for brevity and more particularly illustrating a hydraulic fluid pump, manifold lines and hoses.

As illustrated in FIGS. 1, 5 and 6 of the drawings, a pair of segment ejectors 93 is provided in each one of the movable saw carriages 20 and the fixed saw carriage 20a, and each segment ejector 93 includes an ejection cylinder 94, attached to the carriage frame 21 of each of the movable saw carriages 20 and the fixed saw carriage 20a. Each ejection cylinder 94 receives an ejection cylinder piston 95, designed for extension and retraction inside the ejection cylinder 94. A segment-engaging head 96 is secured to the extending end of each ejection cylinder piston 95, for engaging each of the cut segments (not illustrated) from the stem 100 at the proper time determined by the programmable logic controller 104, and ejecting the segments in concert from the cutting rollers 26 and cutting platform 25 of each of the carriage frames 21, typically to a segment conveyor 75 of suitable design, illustrated in FIG. 1A, for removing the cut segments of the stems 100 from the cutting rollers 26.

Referring again to FIGS. 1, 2 and 6 of the drawings, a pair of stem clamps 66 is provided on the carriage frame 21 of each of the movable saw carriages 20 and the fixed saw carriage 20a above the respective cutting platforms 25 and are each characterized by a clamp arm 67, pivotally secured to a vertical support member of the carriage frame 21 by means of a clamp arm pivot pin 69. Each clamp arm 67 is fitted with arm teeth 68 and is pivotally raised and lowered on the clamp arm pivot pin 69 by means of a clamp arm positioning cylinder 70, pivotally connected by means of a cylinder pivot pin 54a to a cylinder mount plate 16, fixed to the carriage frame 21. A clamp arm positioning cylinder piston 71 is attached to a piston mount plate 19, welded to the clamp arm 67 and is extendible and retractable in each clamp arm positioning cylinder 70. Accordingly, the respective clamp arm positioning cylinders 70 can be operated in concert by the programmable logic controller 104 as hereinafter described, to timely extend and retract the corresponding clamp arm positioning cylinder pistons 71, initially raise the clamp arms 67 to the position illustrated in FIG. 1 to receive a stem 100 and then pivot the clamp arms 67 in a downward direction at the proper time to clamp and stabilize the stem 100 in position on the cutting rollers 26 above the cutting platform 25 of each of the carriage frames 21.

Figure 3:
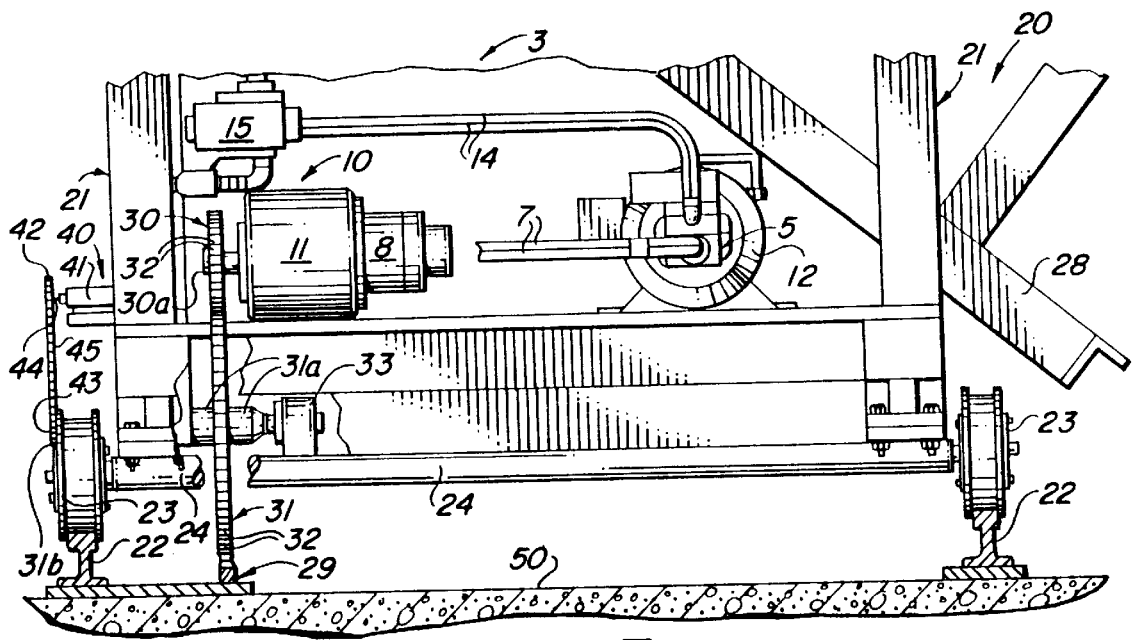
FIG. 3 is an enlarged left side view, partially in section, of the saw carriage illustrated in FIG. 1, with the encoder assembly in place.
Figure 4:
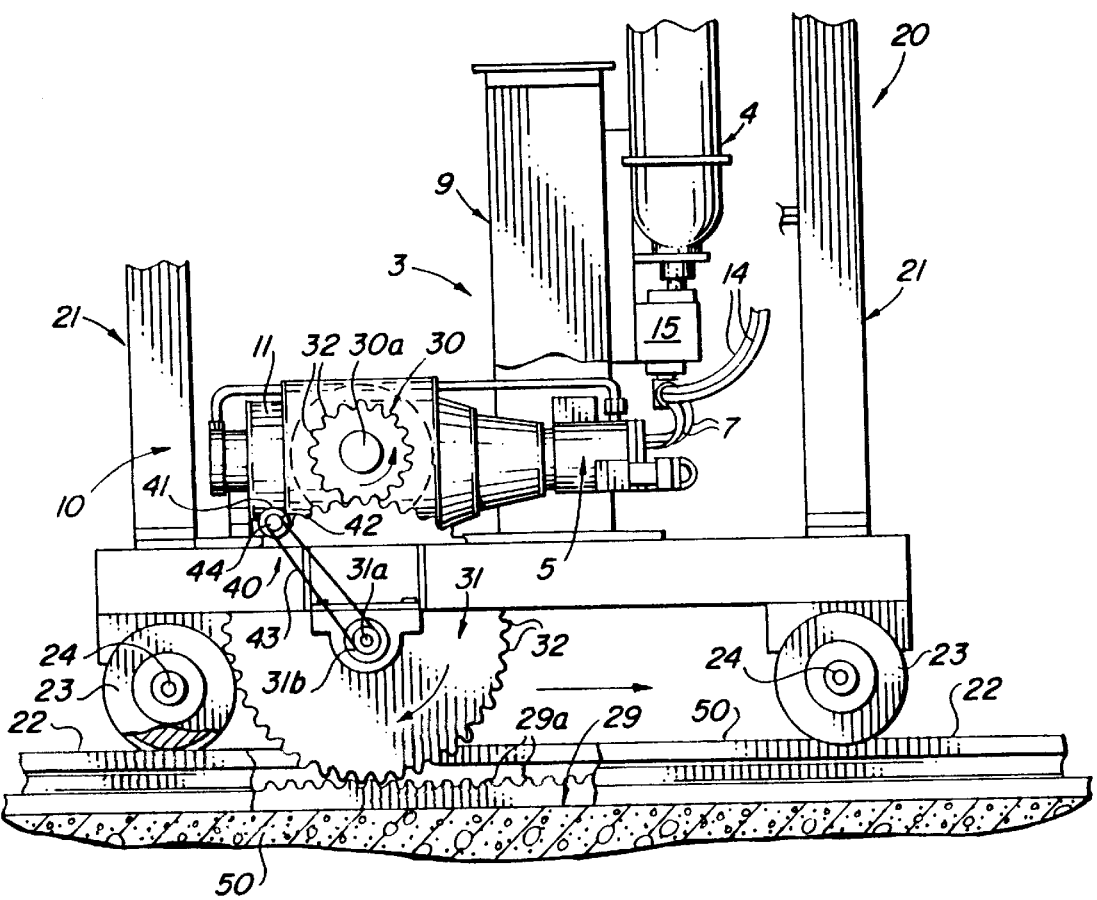
FIG. 4 is an enlarged rear view, partially in section, of the saw carriage illustrated in FIG. 2, also with the encoder assembly in place.

Referring again to FIGS. 1, 2, 3, 4 and 6 of the drawings, in a most preferred embodiment of the invention an encoder assembly 40 is mounted on the carriage frame 21 above the flanged wheels 23 and rails 22 of each movable saw carriage 20 and is operably connected to the programmable logic controller 104 (illustrated in FIGS. 2 and 6) by suitable electrical wiring (not illustrated) extending to the junction boxes 15, illustrated in FIG. 2. Each encoder assembly 40 includes a carriage location encoder 41, which is fitted with an encoder sprocket 42, connected to a driven spur gear shaft 31a by means of a driven spur gear shaft sprocket 31b and an encoder drive chain 43, for measuring the travel of the saw carriages 20 on the rails 22. A horizontal gear rack 29, fitted with rack teeth 29a, is fixed to the supporting surface 50 between and parallel to the rails 22 and extends throughout the length of travel of the respective movable saw carriages 20 on the corresponding rails 22. As further illustrated in FIGS. 3 and 4, a module drive assembly 10 includes a drive spur gear 30, mounted on a drive spur gear shaft 30a, extending from a gear reducer 11, which mounts a hydraulic motor 8, wherein the gear reducer 11 is mounted on the carriage frame 21. A driven spur gear 31 is positioned on a driven spur gear shaft 31a, extending from a spur gear bearing 33 and the driven spur gear 31 is positioned in vertical alignment with the drive spur gear 30, such that the respective spur gear teeth 32 of the drive spur gear 30 and driven spur gear 31 mesh. Operation of the hydraulic motor 8 thus effects rotation of the drive spur gear 30 and driven spur gear 31 at a speed determined by the gear reducer 11, for linearly adjusting each movable saw carriage 20 on the rails 22.

Figure 2:
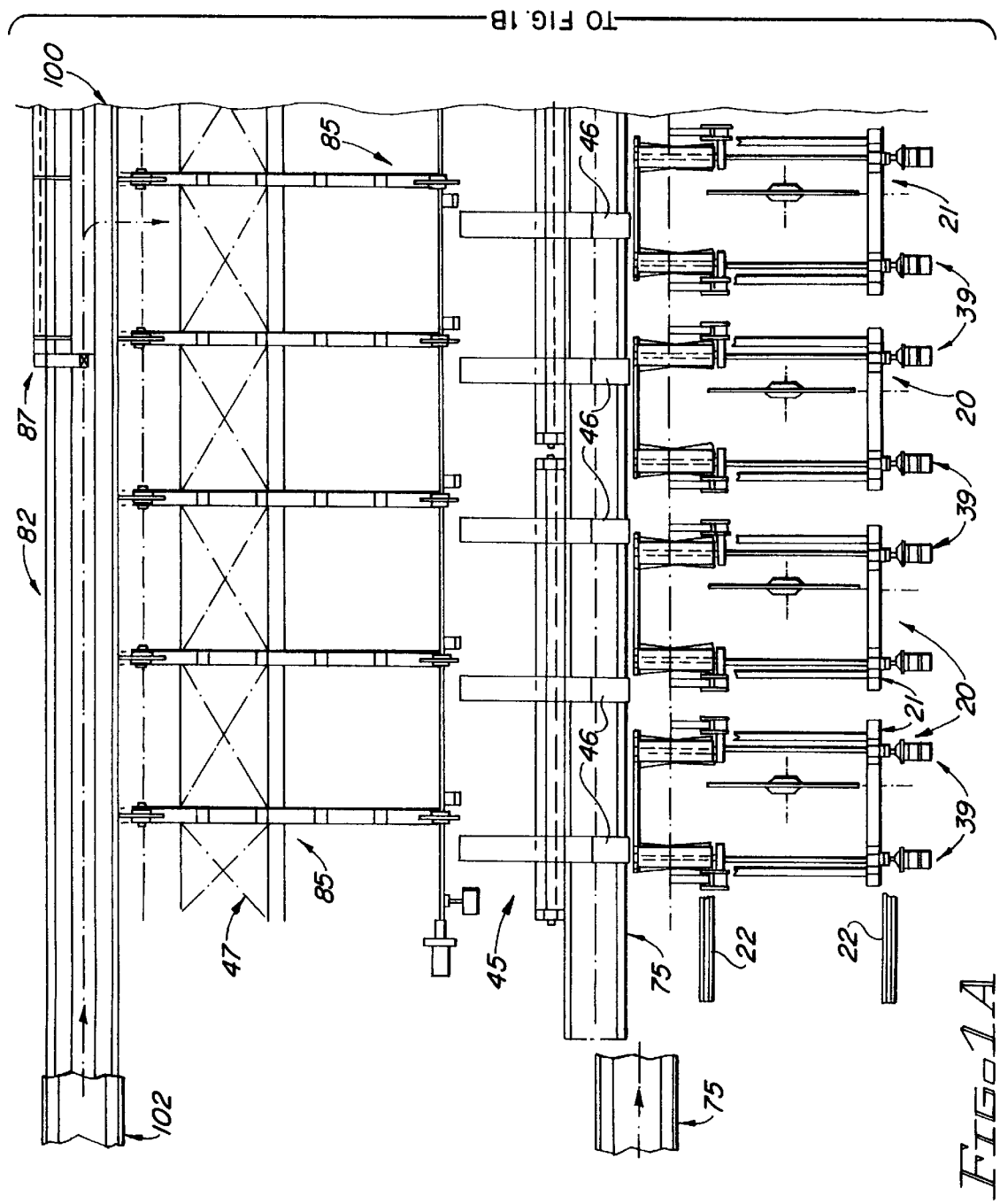
FIG. 2 is a rear view of the saw carriage illustrated in FIG. 1, also with the encoder assembly removed for brevity.

As described above and illustrated in FIGS. 3 and 4, the driven spur gear shaft 31a is connected to the encoder shaft 44 of the carriage location encoder 41. Moreover, as illustrated in FIG. 2 and as further heretofore described, the programmable logic controller 104 is connected to the junction boxes 15 by electric wiring 14. Accordingly, operation of the respective hydraulic motors 8 on the corresponding gear reducers 11 and the corresponding carriage location encoders 41 in the various movable saw carriages 20 responsive to the commands of the programmable logic controller 104 (in semi-automatic or automatic mode), causes each of the movable saw carriages 20 to linearly traverse the rails 22 in increments monitored by the carriage location encoders 41 and determined by the programmable logic controller 104. The programmable logic controller 104 receives pulse signals from the respective carriage location encoders 41 to locate the corresponding movable saw carriages 20 in a precise position with respect to the fixed saw carriage 20a, for cutting each stem 100 into segments of optimum length, responsive to information determined from the scanner 102 and evaluated by the computer 103, as hereinafter further described.

Referring again to FIGS. 1 and 2 of the drawings, a blade assembly 52 is provided in each of the movable saw carriages 20 and the fixed saw carriage 20a; which blade assembly 52 includes an elongated blade ladder 53, pivotally attached to the carriage frame 21 by means of a ladder pivot shaft 63. Each of the blade ladders 53 further includes a saw positioning cylinder 54 and one end of the saw positioning cylinder 54 is pivotally secured to a cylinder mount plate 16 on the carriage frame 21 of each of the saw carriages 20 and the fixed saw carriage 20a, by means of a cylinder pivot pin 54a . The opposite end of the saw positioning cylinder 54 extensibly and retractably receives a saw positioning cylinder piston 55, the extending end of which is pivotally attached to a piston mount plate 19, welded to the blade ladder 53, as illustrated. A circular saw blade 56 is rotatably secured to the lower end of the blade ladder 53 by means of a blade arbor 56a, on a blade shaft 57, rotatably secured in the blade ladder 53. Each saw blade 56 is driven by operation of a blade pulley 61, mounted in the blade end of the blade ladder 53 on a rotatable blade shaft 57 and fitted in driven relationship with a middle shaft pulley 65, mounted on a middle shaft 64, journalled for rotation in the blade ladder 53. A blade belt 61a connects the blade pulley 61 and the middle shaft pulley 65. A motor pulley 60, attached to the motor shaft 60a of a blade drive motor 58, is attached to a middle shaft drive pulley 65a, on the middle shaft 64, by means of a drive belt 62. The blade drive motor 58 is electrically coupled by suitable wiring not illustrated to the junction boxes 15 and from there by means of electric wiring 14 to the programmable logic controller 104 for automatic operation and is attached to a motor mount bracket 59, mounted on the carriage frame 21 near the top end of the blade ladder 53. Accordingly, it will be appreciated that the blade ladder 53 and thus, the blade in each of the movable saw carriages 20 and the fixed saw carriage 20a, can be pivoted on each of the ladder pivot shafts 63 in concert by simultaneous operation of each of the saw positioning cylinders 54, to extend the corresponding saw positioning cylinder pistons 55, position the saw blades 56 in concert and simultaneously cut the stem 100 into multiple segments of optimum length, as further hereinafter described.

As illustrated in FIGS. 1, 2 and 5 of the drawings, in a most preferred embodiment of the invention each of the operating elements on the linearly-adjustable moveable saw carriage 20a and the fixed saw carriages 20 are hydraulically operated by means of the pump motor 12, hydraulic fluid pump 5 and other components of the hydraulic system 3. Hydraulic fluid is pumped from the hydraulic fluid reservoir 9 or the accumulator 4 to the hydraulic fluid manifold 37, where it is selectively dispensed and returned by operation of the programmable logic controller 104 through respective solenoid valves 13, the fixed hydraulic fluid lines 1, mounted on the carriage frame 21, and the corresponding flexible hydraulic fluid hoses 7, to the respective roll drives 39, clamp arm positioning cylinders 70 and ejection cylinders 94. The solenoid valves 13 are electrically connected to the programmable logic controller 104 for orchestration of the roll drives 39, clamp arm positioning cylinders 70 and the ejection cylinders 94, as hereinafter described. Similarly, a set of servo valves 6 is mounted on the fluid manifold 37 and are hydraulically connected by means of the fixed hydraulic lines 1 and flexible hydraulic fluid hoses 7 to the butt plate positioning cylinder 49a, the saw positioning cylinder 54 and the hydraulic motor 8, respectively, for supplying hydraulic fluid to these elements. The servo valves 6 are also electrically connected to the programmable logic controller 104 for orchestration of the butt plate positioning cylinder 49a, saw positioning cylinder 54 and hydraulic motor 8, as further heretofore described.

In automatic operation, the moveable saw carriages 20 and the fixed saw carriage 20a sequentially cut segments of optimum length from incoming stems 100, as follows. The stems 100 are typically delivered in linear sequence to the saw carriage area on a stem conveyor 82, as illustrated in FIG. 1A, where they are initially scanned by the scanner 102 and the physical characteristics of each of the stems 100 are transferred by the scanner 102 to the computer 103 and the desired cutting pattern from the computer 103 to the programmable logic controller 104, as illustrated in FIG. 6. For purposes of this application, the term "physical characteristics" shall mean and include, but not be limited to, the location of limbs, the location of rotten spots, the degree of linearity or straightness, length, cuts, gashes, and other observable characteristics well known to those of ordinary skill in the art. The carriage location encoders 41 continually update the programmable logic controller 104 on the relative positions of the movable saw carriages 20 on the fixed rails 22. Accordingly, when the physical characteristics of each stem 100 are assimilated by the computer 103 and the desired cutting pattern transferred from the computer 103 to the programmable logic controller 104, the system operates as follows: the module drive assembly 10, including the drive spur gear 30 and driven spur gear 31, operate to precisely position the respective movable saw carriages 20 and thus, the saw blades 56 in each of the movable saw carriages 20, responsive to an electric signal from the programmable logic controller 104 and opening of the servo valve 6 which controls the hydraulic motor 8. While selected ones or all of the movable saw carriages 20 are in the process of independent linear adjustment by traversal of the rails 22 responsive to operation of the hydraulic module drive assembly 10, including the drive spur gear 30 and driven spur gear 31, another stem 100 passes in sequence by the scanner 102 and is then typically diverted in sequence by the stem diverters 87 from the stem conveyor 82 to the loading conveyor 85 and then to the fixed stem loaders 45. This diversion is typically accomplished under command of the programmable logic controller 104. Loading of each stem 100 from the stem loaders 46 to the now-still and pre-prepositioned movable saw carriages 20 also occurs by command of the programmable logic controller 104. The loading arms 46 roll the stems 100 in sequence onto the respective cutting rollers 26 located above the corresponding cutting platforms 25 of each of the moveable saw carriages 20 and the fixed saw carriage 20a; with the butt end of the stem 100 resting against or near the butt plate 49, as further illustrated in FIG. 1B. If the butt end of the stem 100 is not resting against the butt plate 49 when the stem 100 is loaded on the cutting rollers 26, the respective roll drives 39 are automatically operated by the programmable logic controller 104 and the respective connecting solenoid valves 13 to supply hydraulic fluid to the roll drives 39, rotate the corresponding roller shafts 26a and cutting rollers 26, shift the stem 100 laterally and seat the butt end of the stem 100 against the butt plate 49. Each butt plate 49 is initially positioned to receive the butt end of the stem 100 by extension of the corresponding butt plate positioning cylinder piston 49b from the butt plate positioning cylinder 49a by operation of a corresponding servo valve 6 upon demand by the programmable logic controller 104. The several movable saw, and carriage 20 single fixed saw carriages 20a are now positioned such that the respective saw blades 56 are nearly ready to cut the stem 100 into segments of optimum length. When each stem 100 is seated on the cutting rollers 26 and adjusted to engage the butt plate 49, the respective solenoid valves 13 on the corresponding manifolds 37 which hydraulically connect to the clamp arm positioning cylinders 70 are opened by operation of the programmable logic controller 104. This action extends the respective clamp arm cylinder positioning pistons 71 from the corresponding clamp arm positioning cylinders 70 and pivots the corresponding clamp arms 67 on the clamp arm pivot pin 69, such that the arm teeth 68 securely engaged the stem 100 and stabilize the stem 100 for cutting, as illustrated in FIG. 1. When the stem 100 is securely clamped in place on the cutting rollers 26, the butt plate positioning cylinder piston 49b is retracted into the butt plate positioning cylinder 49a by operation of the corresponding servo valve 6 and the programmable logic controller 104, to disengage the butt plate 49 from the butt end of the stem 100. The respective blade drive motors 58 are continuously operated and the saw positioning cylinders 54 are activated by electrical actuation of the corresponding servo valves 6, hydraulically connected to the positioning cylinders 54, responsive to command from the programmable logic controller 104, to extend the saw positioning cylinder pistons 55 in concert and cause the blade ladders 53 and the corresponding rotating saw blades 56 to pivot forwardly, such that each blade 56 engages and cuts the stem 100 in concert with the remaining saw blades 56, at the precise locations previously determined by the computer 103 and marked by the respective carriage location encoders 41, as heretofore described. When the stem 100 has been cut into multiple segments, the saw positioning cylinders 54 are reversed in concert by retraction of the saw positioning cylinder pistons 55 responsive to operation of the connecting servo valves 6 and the programmable logic controller 104, and the saw blades 56 are reoriented together into the "ready" position. The clamp arm positioning cylinders 70 are likewise operated to pivot the clamp arms 67 on the clamp arm pivot pin 69 back into the stem loading configuration. The two ejection cylinders 94 in each of the respective moveable saw carriages 20 and the fixed saw carriage 20a are then activated by operation of the corresponding hydraulically-connected solenoid valves 13 responsive to command from the programmable logic controller 104, to extend the corresponding ejection cylinder pistons 95 and the segment-engaging heads 96, contact the respective segments and force the segments from the cutting platform 25, where they typically drop onto a segment conveyor 75, for transport to other areas of the mill for further processing. The segment-engaging heads are retracted by reversing the procedure outlined above and the respective movable saw carriages 20 are now in configuration for repositioning by the respective drive spur gear 30 and driven spur gear 31 in the corresponding module drive assembly 10, according to signals from the programmable logic controller 104, to process the next successive stem 100, which was scanned by the scanner 102 while the first stem 100 was being cut into segments. The process is thus repeated, with the entire stem scanning, loading, adjusting, clamping, cutting and log-ejecting steps repeated in sequence.

Referring again to the drawings, as heretofore described, each of the carriage location encoders 41 in the movable saw carriages 20 is designed to signal the programmable logic controller 104 and facilitate independent location of selected ones or all of the respective movable saw carriages 20 throughout the travel of the movable saw carriages 20 on the rails 22 as the respective driven spur gears 31 traverse the corresponding gear racks 29. It will be appreciated that the movable saw carriages 20 can be moved in either direction on the rails 22, since the carriage encoders 41 and the hydraulic motors 8 which operate the respective drive spur gears 30 are reversible, to reverse the corresponding operation of the driven spur gears 31, depending upon the precisely desired location of each of the respective saw blades 56 with respect to the stem 100 to be cut. Furthermore, the movable saw carriages 20 are designed to overlap in travel, such that each movable saw carriage 20 may move partially into the adjacent movable saw carriage 20 position if the latter is incapacited or is not needed for the cutting pattern selected. The computer 103 may be instructed to eliminate any cutting sequence requiring operation of a disabled movable saw carriage 20 and the programmable logic controller 104 executes these instructions in orchestrating operation of the remaining moveable saw carriages 20.

It is understood that the respective butt plate positioning cylinders 49a, clamp arm positioning cylinders 70, ejection cylinders 94, saw positioning cylinders 54, roll drives 39, hydraulic motors 8 and blade drive motors 58 may be operated by hydraulic, electric or pneumatic equipment, using conventional hoses, couplings, fittings, valves, motors, accessories and the like (not illustrated), according to the knowledge of those skilled in the art. However, in a most preferred embodiment of the invention, these components, with the exception of the blade drive motors 58, are hydraulically operated, as illustrated in the drawings and described herein. Moreover, it is further understood that the hydraulic fluid pumps 5 and pump motors 12 can be located off the respective moveable saw carriages 20 and the fixed saw carriage 20a and one or more hydraulic fluid pumps 5 and pump motors 12 may be fitted with inlet and outlet hydraulic fluid hoses 7 that connect to the respective hydraulic fluid reservoirs 9 and accumulators 4 on the moveable saw carriages 20, and the fixed saw carriage 20a to circulate hydraulic fluid and enable the movable saw carriage 20 operating functions described above.

It will be appreciated by those skilled in the art that the saw carriages 20 and the fixed saw carriage 20a of this invention are characterized by versatility in the number of modules that can be used, as well as the module spacing and range of movement, to customize the system for a specific job. Furthermore, the moveable saw carriages 20 and the fixed saw carriage 20a considerably speed the processing and cutting of incoming stems 100 by minimizing the movement of the stems during the cutting process, to optimize cutting of the stems into logs, poles and other segments of optimum length, using a computerized scanning system. Accordingly, substantially any number of rail-mounted movable saw carriages 20 can be used, depending upon the size and character of the operation envisioned, with each of the movable saw carriages 20 having a carriage location encoder 41 that signals the programmable logic controller 104, electronically connected to the computer 103. In a typical installation multiple moveable saw carriages 20, and one fixed saw carriage 20a, are aligned as illustrated in FIGS. 1A and 1B and any number or all of these saw carriages can be implemented in any desired cutting sequence. For example, if only a butt cut is required, only the blade assembly 52 on the fixed saw carriage 20a is activated to effect this cut. Furthermore, if a stem 100 is to be cut into 3 segments of selected length, the butt cut may be made, if necessary, by the fixed saw carriage 20a in combination with activation of two of the remaining five moveable saw carriages 20 to effect the necessary dual cuts in the stem 100. Furthermore, the scanner 102, or the laser camera, electronic or alternative optical scanning device, the computer 103, programmable logic controller 104 and carriage location encoders 41, as well as the servo valves 6 and solenoid valves 13 attached to the hydraulic fluid manifold 37 and hydraulically connected to the respective butt plate positioning cylinders 49a, hydraulic motors 8, saw positioning cylinders 54, roll drives 39, clamp arm positioning cylinders 70 and ejection cylinders 94, respectively, may be of any desired design, according to the knowledge of those skilled in the art and operate in conventional fashion to achieve the intended result. Moreover, a control console or remote control of selected design may be used to initiate manual, semiautomatic and automatic operation of the moveable saw carriages 20 and the fixed saw carriage 20a, according to the knowledge of those skilled in the art.

Referring again to FIGS. 1 1B and 2 of the drawings, it will be further understood as described above that the saw blade 56 mounted in the fixed saw carriage 20a located on one end of the carriage line is known as the "butt-cut saw" and is fixed and designed to precisely remove that portion of the butt end of the stem 100 resting against the butt plate 49, which cut is necessary to insure that the remaining segments are of optimum length and size. Accordingly, this fixed saw carriage 20a includes only one cutting roller 26, stem clamp 66 and segment ejector 93. The remaining saw blades 56 serve to cut the stem 100 into the respective segments which are transferred, typically by means of a segment conveyor 75, to a debarking or other processing area of the mill, as described in my copending patent application and mentioned above.

As described above, it will also be appreciated by those skilled in the art that the moveable saw carriages 20 and the fixed saw carriage 20a can be manually operated by use of a control panel or remote control device as described above, by eliminating the functions of the scanner 102, computer 103, programmable logic controller 104 and carriage location encoders 41, as desired. The stems 100 can thus be visually evaluated, the movable saw carriages 20 linearly-adjusted on the rails 22 by an appropriate control system and the stems cut as evaluated. Alternatively, any desired function of the moveable saw carriages 20 and the fixed saw carriage 20a can be performed semiautomatically, using the scanner 102 and the programmable controller 104, or bypassing the scanner 102 and utilizing pre-programmed cutting sequences in the programmable controller 104, as desired.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A saw carriage apparatus for cutting a stem having a butt end into segments, comprising:

a plurality of linearly-movable carriages having wheels, each of said plurality of linearly movable carriages being disposed in linearly-aligned relationship with respect to each other for receiving the stem and selectively cutting the stem into segments;

a fixed carriage disposed substantially adjacent to an end one of said plurality of linearly-movable carriages, said fixed carriage comprising a butt plate for engaging the butt end of the stem;

a fixed gear rack disposed beneath said plurality of linearly-movable carriages;

a gear rotatably carried by said plurality of linearly-movable carriages, said gear engaging said gear rack;

fixed rails located beneath each of said plurality of linearly-movable carriages for receiving said wheels of each of said plurality of linearly-movable carriages in linearly-adjustable relationship;

rollers rotatably carried by each of said plurality of linearly-movable carriages and said fixed carriage for receiving the stem and positioning the stem against said butt plate;

a saw provided on each of said plurality of linearly-movable carriages and said fixed carriage for cutting the stem into segments responsive to positioning said plurality of linearly-movable carriages with respect to the stem by traversal of said gear rack by said gear and receiving the stem on said plurality of linearly-movable carriages and said fixed carriage;

a pair of stem clamps carried by each of said plurality of linearly-movable carriages and said fixed carriage for clamping the stem on said rollers and securing the stem for cutting by said saw; and a pair of segment ejectors carried by each of said plurality of linearly-movable carriages and said fixed carriage adjacent to said stem clamps for ejecting the segments from each of said plurality of linearly-movable carriages and said fixed carriage.

2. The saw carriage apparatus of claim 1, further comprising:

a programmable controller electrically connected to said gear; and an encoder carried by each of said plurality of linearly-movable carriages, said encoder being mechanically connected to said gear and electrically connected to said programmable controller for linearly adjusting said each of said plurality of linearly-movable carriages on said fixed rails.

3. The saw carriage apparatus of claim 2, further comprising:

a scanner means for scanning the stem and collecting data concerning the stem; and a computer electrically connected to said scanner and said programmable controller for transferring said data from said scanner to said programmable controller.

4. The saw carriage apparatus of claim 1, further comprising:

a programmable controller electrically connected to said gear; and an encoder carried by each of said plurality of linearly-movable carriages, said encoder being mechanically connected to said gear and electrically connected to said programmable controller for linearly adjusting each of said plurality of linearly-movable carriages on said fixed rails with respect to the stem before the stem is loaded on each of said plurality of linearly-movable carriages; and wherein said butt plate, said rollers, said stem clamps, said saw and said segment ejectors are electrically connected to said programmable controller for adjusting the stem into butt-trimming configuration by said rollers, clamping the stem with said stem clamps, disengaging said butt plate from the butt end of the stem, removing the butt end of the stem with said saw and cutting the stem into segments with said saw, and ejecting the segments from each of said plurality of linearly-movable carriages and ejecting said butt end from said fixed carriage with said segment ejectors, after the stem is loaded in each of said plurality of linearly-movable carriages and said fixed carriage.

5. The saw carriage apparatus of claim 4, further comprising:

a fluid-operated cylinder connected to each of said butt plate, said stem clamps, said saw and said segment ejectors; and a control valve operably connected to said fluid-operated cylinder, said control valve further electrically connected to said programmable controller for operating said butt plate, said stem clamps, said saw and said segment ejectors.

6. The saw carriage apparatus of claim 5, further comprising:

a scanner for scanning the stem and collecting data concerning the stem; and a computer electrically connected to said scanner and said programmable controller for transferring said data from said scanner to said programmable controller.

7. A saw carriage apparatus for cutting a stem having a butt end into segments, comprising:
- at least one adjustable cutting frame linearly adjustable along a traverse line for receiving the stem;
- a fixed cutting frame positioned adjacent to said at least one adjustable cutting frame, for receiving the stem;
- a rack fixedly located beneath said at least one adjustable cutting frame;
- a spur gear rotatably carried by said at least one adjustable cutting frame, said spur gear engaging said rack and said at least one adjustable cutting frame;
- a butt plate disposed on said fixed cutting frame for locating the stem on said at least one adjustable cutting frame and said fixed cutting frame; and
- a pivoting saw pivotally carried by said at least one adjustable cutting frame and said fixed cutting frame for cutting the stem;
- whereby said at least one adjustable cutting frame is adjusted along said traverse line with respect to said fixed cutting frame and said butt plate before the stem is loaded on said at least one adjustable cutting frame and said fixed cutting frame; and
- whereby the stem is cut into segments by said pivoting saw responsive to loading of the stem onto said at least one adjustable cutting frame and said fixed cutting frame.

8. The saw carriage apparatus of claim 7, further comprising:
- a programmable controller electrically connected to said spur gear; and
- an encoder carried by said at least one adjustable cutting frame, said encoder being mechanically connected to said spur gear and electrically connected to said programmable controller for linearly adjusting said at least one adjustable cutting frame;
- wherein said butt plate and said saw are electrically connected to said programmable controller, for linearly adjusting the stem on said at least one adjustable cutting frame and said fixed cutting frame to engage said butt plate, disengaging said butt plate from the butt end of the stem and cutting the stem into segments.

9. The saw carriage apparatus of claim 8, further comprising:
- a scanner for scanning the stem and collecting data concerning the stem; and
- a computer electrically connected to said scanner and said programmable controller for transferring said data from said scanner to said programmable controller.

10. A saw carriage apparatus for cutting a stem having a butt end into segments, comprising a plurality of linearly-movable carriages having wheels, a fixed carriage disposed substantially adjacent to an end one of said plurality of linearly-movable carriages, a fixed gear rack disposed beneath said plurality of linearly-movable carriages and a butt plate disposed on said fixed carriage for receiving and stabilizing the stem on said linearly-movable carriages and said fixed carriage, a first spur gear and a second spur gear rotatably carried by each of said plurality of linearly-movable carriages, wherein said first spur gear engages said gear rack and said first spur gear meshes with said second spur gear;
- wherein said saw carriage apparatus further comprises a hydraulic drive system operably connected in driving relationship to said second spur gear;
- fixed rails located beneath each of said plurality of linearly-movable carriages for receiving said wheels of each of said plurality of linearly-movable carriages in linearly-adjustable relationship;
- a pivoting saw provided on each of said plurality of linearly-movable carriages and said fixed carriage, respectively, for cutting the stem into segments responsive to positioning said plurality of linearly-movable carriages with respect to the stem by traversal of said gear rack by said first spur gear and receiving the stem on said plurality of linearly-movable carriages and said fixed carriage;
- cutting rollers operably connected to said hydraulic drive system and rotatably carried by each of said plurality of linearly-movable carriages and said fixed carriage for receiving the stem and positioning the stem against said butt plate;
- a pair of stem clamps operably connected to said hydraulic drive system and carried by each of said plurality of linearly-movable carriages and said fixed carriage above said cutting rollers for clamping the stem on said cutting rollers and securing the stem for cutting by said pivoting saw; and
- a pair of segment ejectors operably connected to said hydraulic drive system and mounted on each of said plurality of linearly-movable carriages and said fixed carriage adjacent to said cutting rollers for ejecting the segments from each of said plurality of linearly-movable carriages and said fixed carriage.

11. The saw carriage apparatus of claim 10, further comprising:
- a programmable controller electrically connected to said hydraulic drive system for operating said first spur gear, said butt plate, said stem clamps, said pivoting saw and said pair of segment ejectors;
- an encoder carried by each of said plurality of linearly-movable carriages, each of said encoders being mechanically connected to said first spur gear and electrically connected to said programmable controller for linearly adjusting each of said plurality of linearly-movable carriages and said pivoting saw with respect to said fixed carriage and said butt plate with respect to said fixed carriage and said butt plate, positioning the stem on said cutting rollers against said butt plate, clamping the stem, withdrawing said butt plate from contact with the stem, cutting the stem into segments and ejecting the segments from each of said plurality of linearly-movable carriages and said fixed carriage;
- a scanner for scanning the stem and collecting data concerning the stem; and
- a computer electrically connected to said scanner and said programmable controller for providing said data to said programmable controller responsive to entry of said data into said computer.

12. A saw carriage apparatus for cutting a stem having a butt end into segments of selected length, comprising:
- a plurality of linearly-adjustable cutting modules selectively linearly-adjustable along a traverse line for receiving the stem;
- a fixed module positioned adjacent to an end one of said plurality of linearly-adjustable cutting modules;
- a rack fixedly located beneath each of said plurality of linearly-adjustable cutting modules;
- first and second meshing spur gears rotatably carried by each of said plurality of linearly-adjustable cutting modules, said first spur gear engaging said rack;

a hydraulic drive system mounted on each of said plurality of linearly-adjustable cutting modules, said second spur gear mounted in driving relationship on said hydraulic drive system for moving each of said plurality of linearly-adjustable cutting modules along said traverse line;

an hydraulic butt plate operably connected to said hydraulic drive system and mounted on said fixed module for receiving the butt end of the stem;

a pair of hydraulic cutting rollers operably connected to said hydraulic drive system and rotatably carried by each of said plurality of linearly-adjustable cutting modules for positioning the stem against said butt plate;

a pair of hydraulic stem clamps operably connected to said hydraulic drive system and pivotally mounted on each of said plurality of linearly-adjustable cutting modules and said fixed module for clamping the stem;

a hydraulic pivoting circular saw operably connected to said hydraulic drive system and pivotally carried by each of said plurality of linearly-adjustable cutting modules and said fixed module for cutting the stem on each of said plurality of linearly-adjustable cutting modules and said fixed module; and a pair of hydraulic segment ejectors operably connected to said hydraulic drive system and mounted on each of said plurality of linearly-adjustable cutting modules and said fixed module for ejecting the segments from each of said plurality of linearly-adjustable cutting modules and said fixed module;

whereby each of said plurality of linearly-adjustable cutting modules are adjusted along said traverse line with respect to the stem before the stem is loaded on each of said plurality of linearly-adjustable cutting modules and said fixed module responsive to operation of said hydraulic drive system and said spur gears; and whereby the stem is positioned on said hydraulic roller means with the butt end of the stem engaged with said hydraulic butt plate, the stem is clamped by said hydraulic stem clamps, the stem is cut into segments by said hydraulic pivoting circular saw and the segments are ejected from each of said plurality of linearly-adjustable cutting module and said fixed module by said hydraulic segment ejectors.

13. The saw carriage apparatus of claim 12, further comprising:

a programmable controller electrically connected to said hydraulic drive system for operating said hydraulic butt plate, said hydraulic cutting rollers, said hydraulic stem clamps, said hydraulic pivoting circular saw and said hydraulic segment ejectors; and an encoder mechanically connected to said second spur gear and electrically connected to said programmable controller for:
- linearly adjusting each of said plurality of linearly-adjustable cutting modules and said hydraulic pivoting circular saw with respect to the stem;
- positioning the stem on said hydraulic cutting rollers against said hydraulic butt plate;
- clamping the stem with said hydraulic stem clamps,
- disengaging said hydraulic butt plate from the stem;
- cutting the stem into segments with said pivoting circular saw; and
- ejecting the segments from each of said plurality of linearly-adjustable cutting modules and said fixed module with said hydraulic segment ejectors.

14. The saw carriage apparatus of claim 13 further comprising:

a scanner means for scanning the stem and collecting data concerning the stem; and a computer electrically connected to said scanner and said programmable controller;

wherein said programmable controller operates said first and second spur gears responsive to entry of said data concerning the stem into said computer from said scanner.

* * * * *